US011406905B2

(12) United States Patent
Summa et al.

(10) Patent No.: US 11,406,905 B2
(45) Date of Patent: Aug. 9, 2022

(54) SYSTEM AND METHOD FOR COMMUNICATING TARGET INFORMATION TO USERS

(71) Applicant: Dell Products L.P., Round Rock, TX (US)

(72) Inventors: Erik Summa, Austin, TX (US); Marc Randall Hammons, Round Rock, TX (US); David Joseph Zavelson, Austin, TX (US); Philip Seibert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 247 days.

(21) Appl. No.: 16/883,739

(22) Filed: May 26, 2020

(65) Prior Publication Data

US 2021/0370184 A1    Dec. 2, 2021

(51) Int. Cl.
*A63F 13/213*  (2014.01)
*A63F 13/285*  (2014.01)
*A63F 13/837*  (2014.01)
*G06F 3/01*    (2006.01)

(52) U.S. Cl.
CPC .......... *A63F 13/837* (2014.09); *A63F 13/213* (2014.09); *G06F 3/013* (2013.01); *G06F 3/016* (2013.01)

(58) Field of Classification Search
CPC ...... A63F 13/837; A63F 13/213; A63F 13/23; A63F 13/1037; A63F 13/285; G06F 3/013; G06F 3/016
See application file for complete search history.

(56) References Cited

U.S. PATENT DOCUMENTS

| 8,753,211 B2* | 6/2014 | Takagi | A63F 13/822 463/31 |
| 10,792,575 B2* | 10/2020 | MacInnes | G07F 17/3237 |
| 11,020,664 B2* | 6/2021 | Yang | A63F 13/55 |
| 2005/0282635 A1* | 12/2005 | Aoki | A63F 13/798 463/42 |

(Continued)

OTHER PUBLICATIONS

The Division _ Aim @ Gaze accuracy—Tobii Eye Tracking Support, retrieved from url: https://help.tobii.com/hc/en-us/articles/209531289-The-Division-Aim-Gaze-accuracy, retrieved on Mar. 12, 2021.

(Continued)

*Primary Examiner* — Omkar A Deodhar
*Assistant Examiner* — Shauna-Kay Hall
(74) *Attorney, Agent, or Firm* — Baker Botts L.L.P.

(57) ABSTRACT

A system for communicating interactive instructions to a user intercepts video and audio information from an information handling system hosting a game, analyzes where a user is looking and listens for user commands, generates a list of candidate targets, selects a target profile for each candidate target, applies a prioritization policy to select a target from the list of candidate targets, and communicates haptic information to the user to signal an action to take relative to the selected target. The target may be a threat that the user must engage or evade, an object the user must get or avoid, a location the user must move to or avoid, or a route the user must take to attack or evade a threat or achieve a reward.

20 Claims, 4 Drawing Sheets

(56) References Cited

U.S. PATENT DOCUMENTS

| | | | |
|---|---|---|---|
| 2012/0295708 A1* | 11/2012 | Hernandez-Abrego | A63F 13/10 463/36 |
| 2012/0302332 A1* | 11/2012 | Buhr | A63F 13/795 463/29 |
| 2014/0128166 A1* | 5/2014 | Tam | A63F 13/216 463/42 |
| 2015/0202532 A1* | 7/2015 | Takeuchi | A63F 13/79 463/43 |
| 2021/0245053 A1* | 8/2021 | Weng | A63F 13/57 |

OTHER PUBLICATIONS

SteelSeries SDK, retrieved from url: https://media.steelseriescdn.com/filer_public/1b/d8/1bd86f4e-d950-4c03-9c74-d0d6cd6b3294/engine-code.png, retrieved on Mar. 12, 2021.

* cited by examiner

SYSTEM AND METHOD FOR COMMUNICATING TARGET INFORMATION TO USERS

BACKGROUND

Field of the Disclosure

This disclosure relates generally to information handling systems and, more particularly, to systems and methods for communicating targeting information to users of information handling systems playing games hosted by an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments disclosed herein may be generally directed to a system that analyzes game information and user information to generate a list of target candidates, prioritizes the target candidates, selects a target from the list of target candidates, and communicates haptic information to a user for efficient targeting actions associated with the target.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
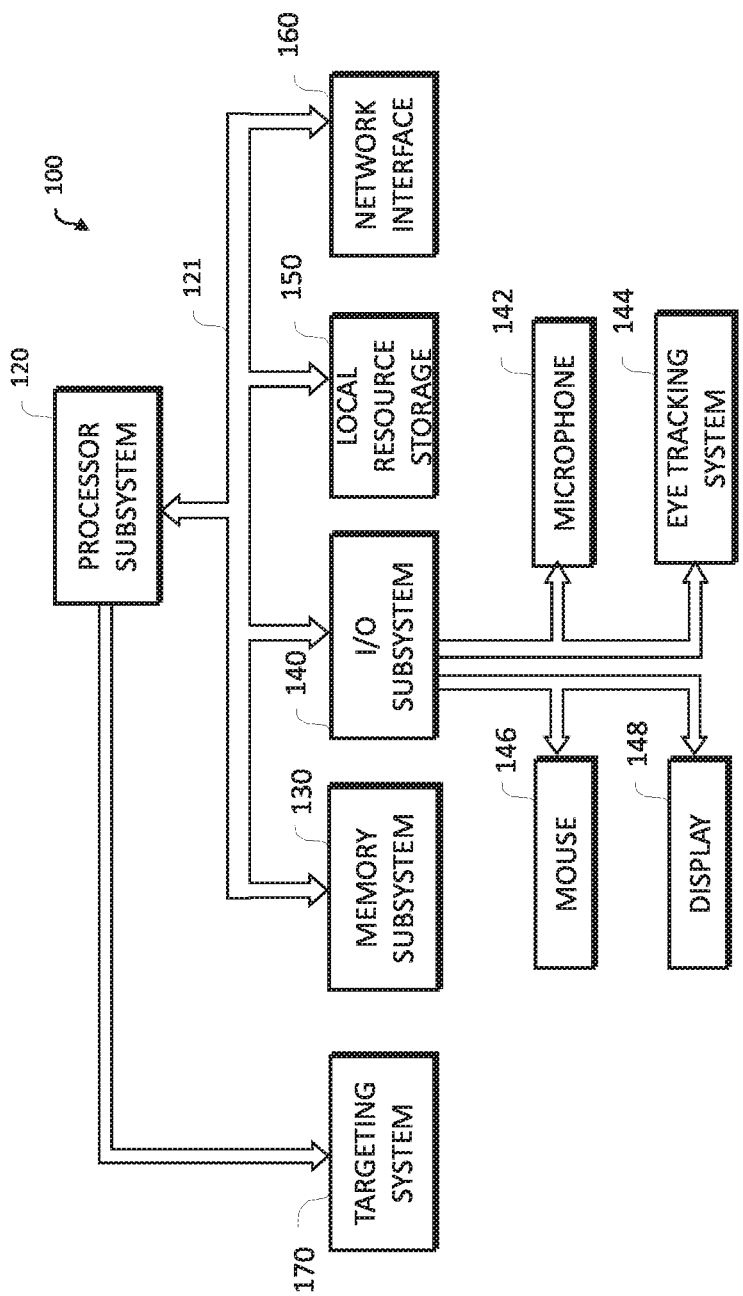
FIG. 1 is a block diagram of selected elements of an embodiment of an information handling system capable of engaging in a game.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Users of information handling systems who want to participate in competitive video game applications are looking for any competitive advantage. For example, gaming mice often have features such as macro buttons, lighting and the ability to dynamically toggle mouse sensitivity, which allow users to leverage the capabilities of information handling systems for faster performance and more accurate target engagement.

Embodiments disclosed herein allow users of information handling systems to identify, prioritize and engage targets more quickly.

Embodiments disclosed herein are described with respect to particular scenarios in online gaming environments. Particular embodiments are best understood by reference to FIGS. 1-4 wherein like numbers are used to indicate like and corresponding parts.

Turning to the drawings, FIG. 1 illustrates a block diagram depicting selected elements of an embodiment of information handling system 100. It is noted that FIG. 1 is not drawn to scale but is a schematic illustration.

As shown in FIG. 1, components of information handling system 100 may include, but are not limited to, a processor subsystem 120, which may comprise one or more processors, and a system bus 121 that communicatively couples various system components to processor subsystem 120 including, for example, a memory subsystem 130, an I/O subsystem 140 comprising microphone 142, eye tracking system 144, mouse 146 and display 148, local storage resource 150, a network interface 160 and targeting system 170.

Processor subsystem 120 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130). In the same or alternative embodiments, processor subsystem 120 may interpret and execute program instructions and process data stored remotely (e.g., in a network storage resource).

System bus 121 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In various embodiments, I/O subsystem 140 may be used to support various peripheral devices, such as microphone 142, eye tracking system 144, mouse 146 and display 148, among other examples. In some implementations, I/O subsystem 140 may support so-called 'plug and play' connectivity to external devices, in which the external devices may be added or removed while information handling system 100 is operating. In some embodiments, functionality of mouse 146 may be performed by a game controller with a set of buttons and sensors for receiving input from a user.

Local resource storage 150 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 160 may be a suitable system, apparatus, or device operable to serve as an interface between information handling system 100 and a network (not shown). Network interface 160 may enable information handling system 100 to communicate over the network using a suitable transmission protocol or standard. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network coupled to network interface 160 or various components associated therewith may be implemented using hardware, software, or any combination thereof.

Users may use information handling system 100 to participate in a game hosted by an information handling system. A game may be played on the information handling system hosting the game or may be played on a first information handling system coupled to a second information handling system hosting an online game. Throughout this document, embodiments may be described in relation to a competitive game hosted by an information handling system coupled to a network (a competitive online game) but may equally relate to non-competitive games hosted by an information handling system coupled to a network (a noncompetitive online game) or a game hosted by the user's information handling system (a local game). In a match of an online game, a user must compete against other users, which may involve moving a character over different types of terrain and navigating through buildings and other structures to locate tools and weapons, while fighting or evading other characters. The quicker a user can move, navigate, locate and fight or evade, the more likely the user can win the match.

Basic Definitions

As used herein, the term "character" may refer to an representation of a person, animal or other organism that a user can move independently in the game. A character may be friendly, hostile or neutral. An example of a friendly character is a teammate in cooperative play of an game with groups, squads or other teams that can affect the outcome of a match. An example of a hostile character is an opponent in a solo match or a member of an opposing team or squad in cooperative play. An example of a neutral character is a non-player character (NPC) such as a hostage or bystander that is not actively trying to defeat or help a user's character.

As used herein, the term "object" may refer to any inanimate item in a game that a character may hold or use. Examples of objects include, but are not limited to, weapons, health kits, vehicles, tools, currency and shields.

As used herein, the term "location" may refer to any place in a game that a character may occupy. Examples of locations include, but are not limited to, buildings, caves and large transporters such as ships.

As used herein, the term "route" may refer to a path or direction that a character can travel along during a game.

Examples of routes include, but are not limited to, stairs, doors, windows and other openings in buildings.

Target—Definition

As used herein, the term "target" may refer to any character, object, location or route that can affect the outcome of a match in a game. For example, a target may be an opposing character competing against the user's character. The opposing character may be controlled by another user at a different information handling system 100 or may be native to the game and may perform according to a set of instructions executed by a host server. A target may be associated with a negative outcome, such as a hostile character trying to defeat the user's character, an object headed in the direction of the user's character that must be avoided, a route to avoid, an enemy stronghold or a dangerous route. A target may also be associated with a positive outcome, such as an object or route needed to advance to the next level or a fortified location. A target may also be associated with both positive and negative outcomes, such as a character that can have a negative outcome by inflicting damage on a user's character but can have a positive outcome if the user's character can defeat the character to gain a reward. A target may be stationary, such as a bridge or route a character may utilize, or may be mobile, such as a vehicle or opposing character. Multiple targets may be presented on a display at the same time, wherein success of a user in a match may depend on how quickly the user can identify, prioritize and engage various targets.

Target Candidate—Definition

As used herein, the term "target candidate" may refer to an object, place or character identified as a possible target. For example, in some competitive online games with characters assigned to two or more teams, every character may have a weapon. However, characters with weapons may be friendly characters, and some games are written so characters are unable to eliminate other characters on their team. Thus, not every character is a target, but may be a target candidate. As another example, if a user's character has a rifle, a cache of ammunition may have a positive outcome if the cache is rifle ammunition but may have neither a positive or a negative outcome if the cache is handgun ammunition, so the cache may be a target candidate until the cache is determined to have a particular type of ammunition. Thus, each character, object, location and route may be considered a target candidate, wherein analysis of a target candidate may be necessary to determine if the target candidate should be a target.

Embodiments disclosed herein may identify target candidates and use a target prioritization policy to determine which target candidate should be identified as a target and communicate information to a user to assist the user in engaging the target quickly. Embodiments may constantly identify target candidates and update the list of target candidates such that, when a target is engaged, the next target is quickly identified and a new set of instructions is communicated to assist the user.

Figure 2:
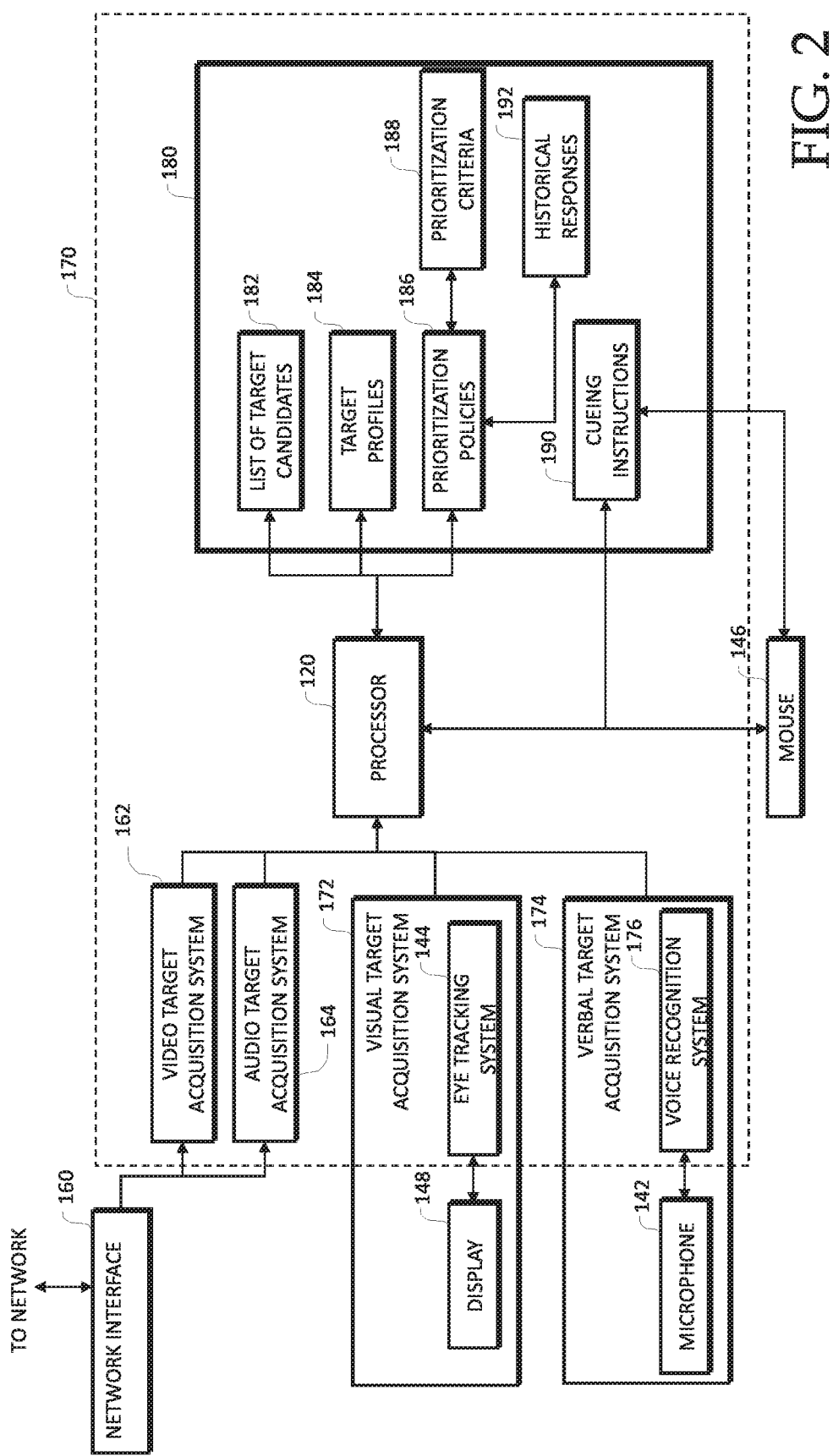
FIG. 2 is a block diagram of one embodiment of a system for identifying and prioritizing a list of target candidates and for communicating target information to a user.

Embodiments disclosed herein include a targeting system to identify targets and provide target information to a user during a match of a game. As illustrated in FIG. 2, embodiments of a targeting system 170 may include video target acquisition system 162, audio target acquisition system 164, visual target acquisition system 172 and verbal target acquisition system 174. Targeting system 170 may further include targeting memory 180 storing a list of target candidates 182, a plurality of target profiles 184, a plurality of prioritization policies 186, prioritization criteria 188, cueing instructions 190 and historical responses 192.

Video target acquisition system 162 may intercept video information sent from a game system to network interface 160 and may analyze video information to identify a target candidate. In some embodiments, video target acquisition system 162 comprises memory subsystem 130 storing a set of instructions executable by processor subsystem 120 to analyze video information received by network interface 160 before communicating the video information to a GPU or other processor 120 associated with display 148.

Target candidate information may be identified by video target acquisition system 162 based on an analysis of scripts, parameters or other video information received from the game system. Examples of video information may include, for example, information that a character is approaching a user's character, information identifying friendly characters with a first color and hostile characters with a second color, and information that a character is or is not aiming a weapon at the user's character. Video information may also include, for example, an arrow, glow or halo identifying an object, location or route. Video information may be analyzed using machine learning or neural network techniques. For example, a neural network may be trained to recognize or classify images that are representative of gameplay, including but not limited to identifying friends, foes, weaponry and ammunition, vehicles, entrances/exits and shield or health-related items.

Audio target acquisition system 164 may intercept audio information received by network interface 160 from a game system and analyze the audio information to identify a target candidate. In some embodiments, audio target acquisition system 164 comprises memory subsystem 130 storing a set of instructions executable by processor subsystem 120 to analyze scripts, parameters or other audio information received by network interface 160 before communicating the audio information to a processor 120 associated with speakers or headphones. In some embodiments, audio target acquisition system 164 monitors communications from processor subsystem 120 to a speaker or headphones to identify a sound profile and compares the sound profile with a plurality of sound profiles to identify a target candidate. Identifying a target candidate may include audio target acquisition system 164 analyzing audio information to determine spatial information such as a location or distance of a target candidate relative to a user's character. Target candidate information may include sound profiles received from a game system. Examples of audio information include footsteps, sound profiles associated with vehicles, gunfire and explosions, and commands or dialogue from another character.

Visual target acquisition system 172 may analyze visual information associated with a user looking at display 148 to identify a target candidate. In some embodiments, visual target acquisition system 172 includes eye tracking system 144 configured to determine visual information including user gaze location associated with where a user is looking on display 148. Visual target acquisition system 172 may determine information about a direction and speed in which the user's gaze is changing. For example, visual information may include information that the user's gaze is moving from left to right. In some embodiments, visual target acquisition system 172 comprises memory subsystem 130 storing a set of instructions executable by processor subsystem 120 to analyze information from eye tracking system 144 to determine a region of display 148 corresponding to where the user is looking and analyze video information presented on display 148 corresponding to where the user is looking to identify a target candidate. For example, visual information may include the position of a reticle or crosshairs relative to a target candidate on display 148.

Verbal target acquisition system 174 may receive and analyze verbal information associated with a user speaking into microphone 142 to identify a target candidate. In some embodiments, verbal target acquisition system 174 comprises memory subsystem 130 storing a set of instructions executable by processor subsystem 120 to analyze information received from microphone 142 to identify a target candidate. Verbal information may include spoken commands, instructions or other information conveyed by a user using microphone 142 and analyzed by voice recognition software 176. Examples of verbal information include commands to attack, run away, pick up an object, and move to a location or along a route. In some embodiments, verbal target acquisition system 174 may associate commands with a user such that verbal target acquisition system 174 does not identify target candidates based on commands by other people in the room or playing the game.

Targeting memory 180 may store a set of instructions executable by a processor to communicate with one or more of video target acquisition system 162, audio target acquisition system 164, visual target acquisition system 172, and verbal target acquisition system 174. In some embodiments, each of video target acquisition system 162, audio target acquisition system 164, visual target acquisition system 172 and verbal target acquisition system 174 may identify a set of target candidates and store a target candidate in memory system 130, and processor subsystem 120 may analyze the target candidates in memory 130 to generate a list of all target candidates 182.

In some embodiments, processor subsystem 120 may compare information from two or more target candidate acquisition systems to verify a target candidate 182 or prevent multiple instances of the same target candidate 182. For example, a user may look at a region of display 148 and visual target acquisition system 172 may identify a target candidate 182 and audio target acquisition system 164 may intercept audio information including a sound profile associated with a threat that also corresponds to the same target candidate 182. Instead of identifying a second target candidate 182, embodiments may determine the target candidate 182 identified by audio target acquisition system 164 is the same target candidate 182 identified by visual target acquisition system 172.

As mentioned above, multiple target candidates 182 may be presented on a display at the same time, wherein success of a user in a match may depend on how quickly the user can identify, prioritize and engage a target. For each target candidate 182 identified by targeting system 170, embodiments may analyze the target candidate 182. Analysis may include a processor associating a target candidate 182 with a target profile 184 from a plurality of target profiles 184 stored in targeting memory 180.

Target Profiles

As used herein, the term "target profile" may refer to a data structure comprising characteristics of a target or target candidate. A target profile 184 may be a default profile, a generic profile or a user-specific profile. For example, in an online game with characters trying to inflict damage on each other, a first target profile 184 may be associated with any character carrying a weapon and a second target profile 184 may be associated with any character without a weapon. In another embodiment, in an online game with characters trying to inflict damage on each other, characters that are native to the online game may have a generic target profile 184 and characters corresponding to players may have specific target profiles 184. In another embodiment, in an online game with characters trying to inflict damage on each other, each character may have a target profile 184 based on a weapon, a speed, a strength, a tool, supplies or other characteristics.

Target Identification and Prioritization

Figure 3:
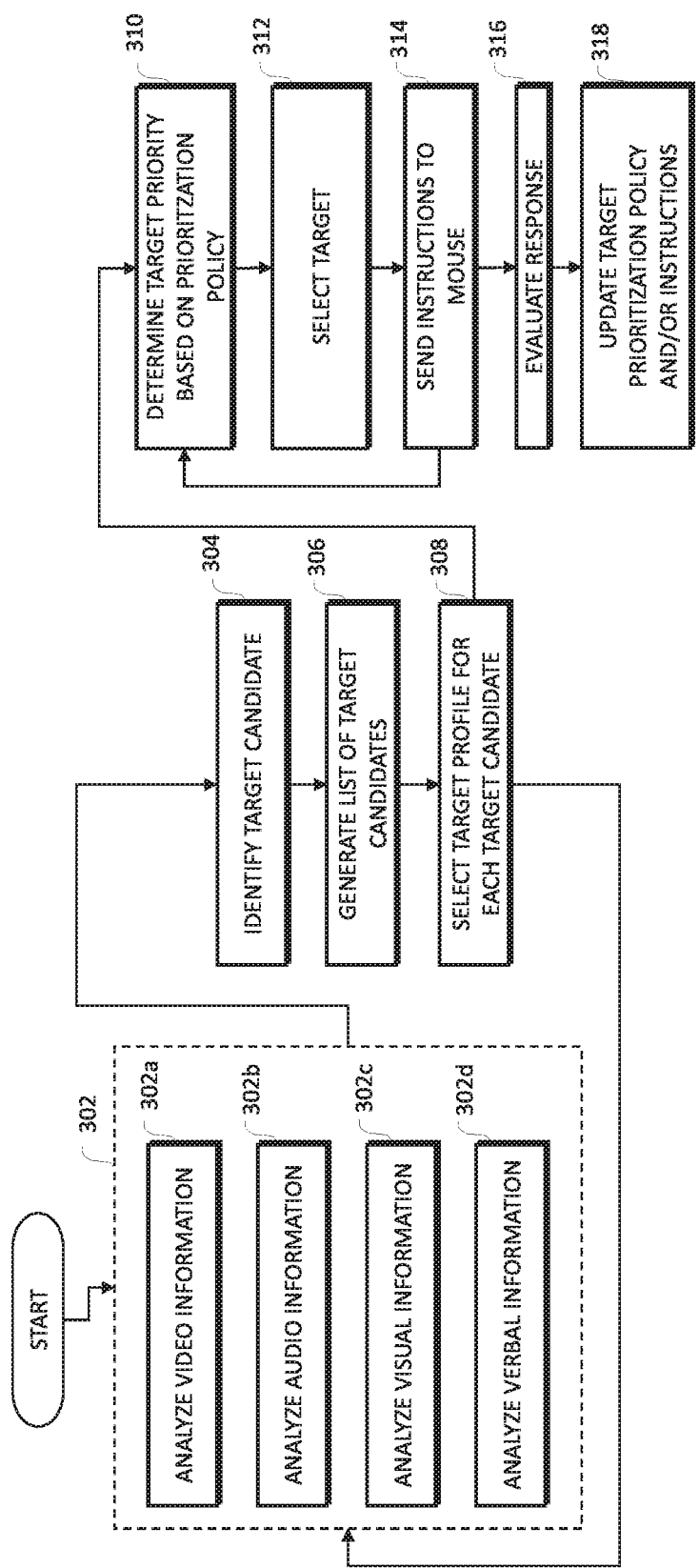
FIG. 3 is a flow diagram of one embodiment of a method for identifying a list of target candidates and for communicating target information to a user.

During a match of a game, embodiments may continuously identify target candidates 182 from one or more of video target acquisition system 162, audio target acquisition system 164, visual target acquisition system 172 and verbal target acquisition system 174. As each target candidate 182 is identified, embodiments may analyze the target candidate 182. FIG. 3 depicts a flow diagram of a method for identifying and analyzing target candidates 182 in a match of a game for communicating target information to a user using information handling system 100.

The method begins at step 302 when information is received from one or more of video target acquisition system 162, audio target acquisition system 164, visual target acquisition system 172 and verbal target acquisition system 174.

At step 302, information is analyzed to identify target candidates 182. For example, audio target acquisition system 164 may use machine learning to analyze sound information such as a sound profile associated with a weapon used by characters.

At step 302a, video target identification system 162 may analyze video information. Video information may include scripts or other information intercepted from network interface 160. For example, in an online game, video information may be sent that specifies the user's character and any teammates' characters will be displayed with a blue banner and any opposing players' characters will be displayed with red banners. Embodiments may analyze video information to identify characters with red banners. In some embodiments, video information may be analyzed by video target identification system 162 before the information is presented on display 148.

At step 302b, audio target identification system 164 may analyze audio information. Audio information may include information about character that is not visible on display 148, such as a character approaching the user's character from behind. Audio information may include information such as a sound profile associated with a type of weapon or a sound distribution profile indicating a direction from which a character or object is approaching. In some embodiments, audio information may be analyzed by audio target identification system 164 before the information is output to a speaker or headphones.

At step 302c, visual target identification system 172 may analyze visual information associated with a user looking at display 148. Eye tracking system 144 may identify a region of display 148 to which a user is looking. In some embodiments, eye tracking system 144 may include a game reticle (e.g., crosshairs) presented on display 148 and visual target identification system 172 may determine where the user is looking based on the location of the reticle.

At step 302d, verbal target identification system 174 may analyze verbal information received from a user via microphone 142. A spoken command may be used to synthesize an unlabeled character or target region (e.g., "run away" or "left") when the spoken command correlates to a target candidate 182 provided by another target acquisition system. For example, if a user says "run away", embodiments may identify a character in the vicinity of the user's character and determine the user is wanting to avoid the character. Similarly, if the user says "attack", embodiments may determine the user is wanting a character to engage the nearest hostile character.

At step 304, embodiments may identify a target candidate 182 based on the information received from one or more of visual target acquisition system 172, video target acquisition system 162, verbal target acquisition system 174 and audio target acquisition system 164.

At step 306, embodiments may generate a list of all target candidates 182 identified by one or more of video target acquisition system 162, audio target acquisition system 164, visual target acquisition system 172 and verbal target acquisition system 174. A list of target candidates 182 may be stored in memory 180 accessible by processor subsystem 120.

At step 308, for each target candidate 182 in the list of target candidates 182, embodiments may select a target profile 184 from a repository of target profiles 184. In some embodiments, when a user plays a game for the first time, all target profiles 184 may be set to default profiles. For example, embodiments may store a default "enemy" profile 184 associated with shooting such that any audio information associated with shooting is assigned the default "enemy" target profile 184. In some embodiments, each time the user plays the game, a target profile 184 may be updated for quicker identification of target candidates and selection of a target.

Steps 302, 304, 306 and 308 may be performed continuously during a match to maintain a relevant list of target candidates. For example, in a match of a competitive online game with multiple users, embodiments may identify a target candidate 182 and subsequently another user may remove that target candidate 182, such as by reaching an object first and taking the object, by engaging and neutralizing a character, by taking a route or by occupying a location. Similarly, another user playing a match of an online game may suddenly need to leave the game, an object may be offered for only a limited time, or a location or a route that was available is now unavailable such that a target candidate 182 may be removed from the list.

At step 310, embodiments determine a target priority for each target candidate 182 based on application of a prioritization policy 186 to each target profile 184. Targeting memory 180 may store a plurality of prioritization policies 186 and each prioritization policy 186 may specify one or more prioritization criteria 188 to apply to a target profile 184 associated with a target candidate 182. For example, a prioritization policy 186 may specify a prioritization criteria 188 of "known hostile character" to a target profile 184 of a character. Using this prioritization criteria 188, a character with a label of "known hostile character" may be assigned a higher priority than a character with a label of "unknown character". Other prioritization criteria 188 may include, for example, a proximity of one or more target candidates 182, a game state (e.g., solo vs. cooperative play), health of a user's character or a teammate's character or health of a target candidate 182. For example, a first prioritization policy 186 may be applied when a user is participating in a match as a solo player and has a high health level or shield strength, a second prioritization policy 186 may be applied when the user is participating in a match as a solo player and has a low health level or shield strength and a third prioritization policy 186 may be applied when the user is participating in a match as part of a team.

Applying prioritization policy 186 to prioritization criteria 188, the list of target candidates 182 may be put in an order or assigned a rank based on the target profiles 184. In some embodiments, a first target candidate is assigned a top-rank target priority and each new target candidate identified thereafter is compared to the first target candidate 182 to see if the new target candidate 182 should replace the top-ranked target candidate 182 or have a lower priority. In some embodiments, the list of target candidates 182 may be prioritized based on a chain of preferred behaviors that are applied in sequence. In some embodiments, a prioritization policy 186 can include one or more of a target classification, a scalar assigned priority, and a feedback-based usage score for the profile. In some embodiments, a target priority for a target candidate 182 may be based on a position of a game reticle relative to the target candidate 182.

At step 312, in some embodiments a target is selected from the list of target candidates 182 based on the target priority. The target may be a character, an object, a location or a route.

At step 314, a set of instructions are sent to mouse 146. In some embodiments, instructions may include instructions for visual target acquisition system 172 to assist a user. For example, a user playing an online game may see a target to engage and visual target acquisition system 172 may identify a target candidate using on eye tracking software 144. If the user starts moving mouse 146 to cause the game reticle to move toward the target candidate, processor subsystem 120 may analyze the user's movements of mouse 146 and select the target candidate as the target. When the game reticle is nearly on the target, the user may click a button and processor subsystem 120 may communicate with visual target acquisition system 172 and position the game reticle on the target.

In some embodiments, instructions sent to mouse 146 include instructions for generating a haptic signal with a haptic profile for communicating information corresponding to a behavioral response associated with a target. In some embodiments, a haptic signal may communicate information to a user that the user's character should move away from a target. For example, a haptic signal may communicate information to a user that the user's character is near a target and may further indicate the user should move the user's character to the left. A change in the haptic profile may communicate information that another character is approaching the user's character, moving away from the user's character, is hiding from the user's character, or some other information. The set of instructions may communicate information that a user's character should start moving, stop moving, change directions, jump, duck or perform some other movement. A change in the haptic profile may also indicate the user should speed up a movement or slow down a movement. The set of instructions may communicate information that a user's character should aim higher, aim lower, aim more to the left or right, zoom in, pan out, reload, or switch magazines or weapons. The set of instructions may communicate information that a user's character should go through a door, through a window, up or down a set of stairs, or take some other route.

At step 316, processor subsystem 120 may evaluate a user's response. In some embodiments, evaluating a user's response may include determining if the user engaged the target, if the user engaged the target using an action in response to a haptic signal communicated using mouse 146.

At step 318, processor subsystem 120 may update a target prioritization policy or instructions, discussed in greater detail below.

Figure 4:
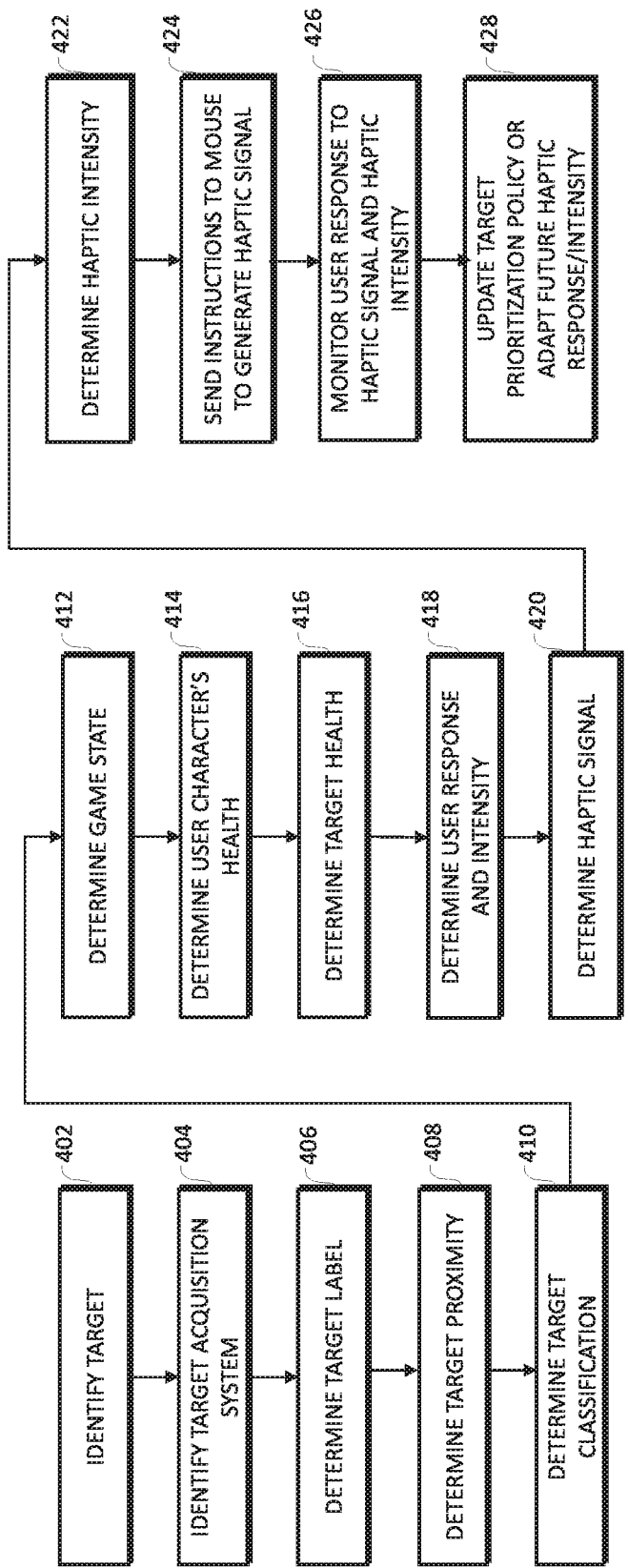
FIG. 4 is a flow diagram of one embodiment of a method for prioritizing target candidates and communicating target information to a user.

FIG. 4 depicts a flow diagram of a method for prioritizing target candidates 182 and communicating target information to a user of an online game.

Embodiments may begin with step 402 when information handling system 100 selects a target, as described above.

At step 404, embodiments may identify a target acquisition system. A target acquisition system may be, for example, video target acquisition system 162, audio target acquisition system 164, visual target acquisition system 172 or verbal target acquisition system 174.

At step 406, embodiments determine a target label. In some online games, identification of a target may be challenging because a user can switch the appearance (also known as a skin) of a character such that a user's character has a first appearance in a first match and a second appearance in a second match. In these cases, video information and audio information from the first match may be less helpful or even detrimental to identification of the target. Determining a target label may include identifying a name of a character, object, location or route.

At step 408, embodiments determine a target proximity. In some embodiments, determining a target proximity may include determining a location of the target. For example, a target may be assigned a farther proximity if the target is behind a building, At step 410, embodiments determine a target classification. For example, a target classification may be on a scale from 0-9, have a general target classification such as "Low" for low value targets, or may be more specific such as "Sniper".

At step 412, embodiments determine a game state. A game state may be cooperative play, in which multiple users must cooperate to win. A game state may be solo play in which each user is against all other users. A game state may be head-to-head, in which only two users compete against each other. A game state may specify the user's character is part of an offensive force or in a defensive position, may include hostages or non-player characters (NPCs), may specify a time limit, may specify a "daytime mode" or a "night mode", may specify that characters can be eliminated by "friendly fire", or other rules or characteristics. In each game state, there may be characters controlled by other users and/or characters controlled by a set of instructions executed by a processor associated with the game.

At step 414, embodiments determine a user character's health. A character health may be a score on a scale from 0-100 (e.g., "75% health"), a level from a set of levels (e.g. "Low" health of a possible "Low/Medium/High" scale) and may include other health information (e.g., "Shields at 80%", or "Low ammunition"). In some embodiments, determining a character health includes determining the health of a teammate in a cooperative play game state (e.g., "Teammate X injured").

At step 416, embodiments determine a target health. A target health may be a score or a level. If the target is a character, a target health may be a score on a scale from 0-100 (e.g., "75% health"), a level from a set of levels (e.g. "Low" health of a possible "Low/Medium/High" scale) and may include other health information (e.g., "Shields at 80%"). Target health information may indicate damage inflicted on the target, which may be indicated by a score or percentage (e.g., 50% strength), a bar graph, or graphics indicating health or damage. If the target is an object, the target health may indicate the availability of the object (e.g., only two left) or popularity (e.g., 75% of users select this weapon). If the target is a location or route, target health may indicate a percentage of users that have selected the target or chance of success.

At step 418, embodiments determine a user response and intensity. A user response may generally involve engaging the target or avoiding the target. For example, in some online games, a user has the option to attack or run away from an enemy character, and also has the option to climb into a vehicle or climb out of the vehicle, and has the option to pick up weapons, tools and supplies and place or trade weapons, tools and supplies. An intensity may be associated with the user response. For example, a user response may be to avoid a target, and an intensity may specify whether to walk or run away from the target.

At step 420, embodiments determine a haptic signal for cueing the user to perform the user response to assist the user in responding to a target in the shortest amount of time. For example, embodiments may determine a user response to a target is to avoid the target by moving the user's character to the left. Embodiments may select a haptic signal intended to signal the user to move the user's character to the left. A haptic signal may be associated with one or more haptic generators.

At step 422, embodiments may determine a haptic intensity to assist the user in responding to a target in the shortest amount of time. For example, if a user response to a target is to avoid the target by moving the user's character to the left, embodiments may select a haptic intensity to signal the user to move mouse 146 to the left quickly and/or a farther distance.

At step 424, embodiments send a set of instructions to mouse 146 or other peripheral device for generating the haptic signal at the haptic intensity. Continuing the scenario in which a behavioral response to a target is to avoid the target by the user's character running to the left, a set of instructions sent to mouse 146 may cause a haptic signal generator to generate a vibration on the left-hand side of mouse 146 to cause the user to want to move mouse 146 in a direction to the left and a haptic intensity may include a large amplitude or higher frequency. In some embodiments, the set of instructions may further include instructions to generate a secondary haptic signal in mouse 146 if the user moves mouse 146 up or down, if the user moves mouse 146 too far to the left, or if the user moves mouse 146 too slowly. A haptic intensity of the secondary haptic signal may start small but increase if the user continues to move mouse 146 farther away from the direction associated with a primary haptic signal.

At step 426, embodiments monitor the user's response to the haptic signal and/or haptic intensity. Embodiments may evaluate, for example, an outcome, a reaction time, a direction, a speed and/or distance in which mouse 146 was moved, a button activated on mouse 146 and a time needed to engage a second target.

At step 428, embodiments may update a target prioritization policy or adapt future haptic signals or intensities based on the response. In some embodiments, a usage score may be associated with a set of haptic signal instructions including a haptic signal, a haptic intensity and one or more haptic generators used to generate the haptic signal. For example, a set of haptic signal instructions may include an instruction to generate a haptic signal on the left side of mouse 146 to signal the user to move mouse 146 to the left. If the user always moves mouse 146 to the left in response to mouse 146 performing the instruction, the set of instructions may be assigned a usage score of 100%. In some embodiments, if the usage score is too low, the set of instructions may be updated. For example, if the user never moves mouse 146 to the left in response to mouse 146 performing the instruction, the set of instructions may be assigned a usage score of 0% and adapted for future responses to targets.

The steps described above may be repeated as necessary to communicate target information to take during a match of a game hosted by an information handling system.

Embodiments may be performed by an information handling system hosting a game or by a first information handling system communicatively coupled to a second information handling system hosting a game. Embodiments may also use machine learning or neural networks to identify and analyze information. For example, information handling system 100 may use machine learning or neural networks to identify friends and foes, even when a character changes a skin, switches weapons, or has other changes relative to the original appearance of the character. Machine learning and neural networks may also aid in determining a distance, direction or speed relative to a target candidate or target.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A targeting system for a game hosted by an information handling system, the targeting system comprising:
    a memory storing a set of instructions executable by a processor to:
    intercept video information; and
    identify a first set of target candidates based on the intercepted video information;
    intercept audio information; and
    identify a second set of target candidates based on the intercepted audio information;
    determine a position on a display corresponding to a user gaze location; and
    identify a third set of target candidates based on the user gaze location;
    receive verbal instructions from a user; and
    identify a fourth set of target candidates based on the verbal instructions;
    generate a list of target candidates from the first set of target candidates, the second set of target candidates, the third set of target candidates and the fourth set of target candidates;
    for each target candidate, select a target profile from a plurality of target profiles, wherein each target profile defines a behavior associated with a target;
    apply a target prioritization policy from a plurality of target prioritization policies to select a target from the list of target candidates, wherein each target prioritization policy identifies a set of target criteria for determining a target priority; and
    send a set of instructions to a mouse for generating a haptic signal for communicating information to the user to perform an action associated with the target.

2. The targeting system of claim 1, wherein the set of instructions is executable by the processor to apply a target prioritization policy based on one or more of a target candidate distance, a target candidate speed and a target candidate classification in the set of target criteria.

3. The targeting system of claim 2, wherein the set of instructions is executable by the processor to apply a target prioritization policy based on one or more of a status of a character and a game state in the set of target criteria.

4. The targeting system of claim 1, wherein the set of instructions sent to the mouse includes one or more of a direction of motion of the mouse, a speed of motion of the mouse, a haptic signal profile and a haptic signal intensity.

5. The targeting system of claim 1, wherein the memory stores:
    a predicted outcome corresponding to the set of instructions sent to the mouse; and
    the set of instructions is executable by the processor to:
    determine an outcome associated with the action performed by the user; and
    update one or more of the target prioritization policy and the set of instructions for sending to the mouse based on the action taken by the user.

6. The targeting system of claim 5, wherein the set of instructions is executable by the processor to:
    send the set of instructions to the mouse based on a usage score;
    compare the outcome associated with the action performed by the user with the predicted outcome; and
    update the usage score associated with the set of instructions sent to the mouse.

7. The targeting system of claim 5, wherein if the outcome associated with the action performed by the user does not match the outcome corresponding to the set of instructions, the set of instructions is executable by the processor to:
    update one or more of the target prioritization policy and the set of instructions for sending to the mouse based on the action taken by the user.

8. An information handling system, comprising:
    a processor subsystem;
    a display for displaying information to a user;
    a mouse for receiving information from the user; and
    a targeting system comprising:
    a memory storing a set of instructions executable by a processor to:
    intercept video information; and
    identify a first set of target candidates based on the intercepted video information;
    intercept audio information; and
    identify a second set of target candidates based on the intercepted audio information;
    a visual-based target acquisition subsystem configured to:
    determine a position on a display corresponding to a user gaze location; and
    identify a third set of target candidates based on the user gaze location;
    a verbal-based target acquisition subsystem configured to:
    receive verbal instructions from the user; and
    identify a fourth set of target candidates based on the verbal instructions;
    a memory storing:
    a plurality of target profiles, wherein each target profile defines a behavior associated with a target;
    a plurality of target prioritization policies, wherein each target prioritization policy identifies a set of target criteria for determining a target priority; and
    a set of instructions executable by a processor to:
    generate a list of target candidates from the first set of target candidates, the second set of target candidates, the third set of target candidates and the fourth set of target candidates;
    for each target candidate, select a target profile from the plurality of target profiles;

apply a target prioritization policy from the plurality of target prioritization policies to select a target from the list of target candidates; and send a set of instructions to a mouse for generating a haptic signal for communicating information to the user to perform an action associated with the target.

9. The information handling system of claim 8, wherein the set of instructions is executable by the processor to apply a target prioritization policy based on one or more of a target candidate distance, a target candidate speed and a target candidate classification in the set of target criteria.

10. The information handling system of claim 9, wherein the set of instructions is executable by the processor to apply a target prioritization policy based on one or more of a status of a character and a game state in the set of target criteria.

11. The information handling system of claim 8, wherein the set of instructions sent to the mouse includes one or more of a direction of motion of the mouse, a speed of motion of the mouse, a haptic signal profile and a haptic signal intensity.

12. The information handling system of claim 8, wherein the memory stores:
   a predicted outcome corresponding to the set of instructions sent to the mouse; and
   the set of instructions is executable by the processor to:
      determine an outcome associated with the action performed by the user; and
      update one or more of the target prioritization policy and the set of instructions for sending to the mouse based on the action taken by the user.

13. The information handling system of claim 12, wherein the set of instructions is executable by the processor to:
   send the set of instructions to the mouse based on a usage score;
   compare the outcome associated with the action performed by the user with the predicted outcome; and
   update the usage score associated with the set of instructions sent to the mouse.

14. The information handling system of claim 12, wherein if the outcome associated with the action performed by the user does not match the outcome corresponding to the set of instructions, the set of instructions is executable by the processor to:
   update one or more of the target prioritization policy and the set of instructions for sending to the mouse based on the action taken by the user.

15. A computer-implemented method for identifying targets in a game hosted by an information handling system, the method comprising:

intercepting one or more of video information and audio information from an information handling system hosting a game;

monitoring a display to determine a position on a display corresponding to a user gaze location;

monitoring a microphone to receive verbal instructions from a user;

generating a list of target candidates based on one or more of the intercepted video information, the intercepted audio information, the user gaze location and a verbal instruction;

associating a target profile with each target candidate, wherein each target profile defines a behavior associated with a target;

applying a target prioritization policy from a plurality of target prioritization policies to select a target from the list of target candidates, wherein each target prioritization policy identifies a set of target criteria for determining a target priority; and sending a set of instructions to a mouse for generating a haptic signal for communicating information to the user to perform an action associated with the target.

16. The method of claim 15, wherein sending the set of haptic signal instructions comprises sending a first instruction for a first haptic intensity and sending a second instruction for a second haptic intensity greater than or less than the first haptic intensity.

17. The method of claim 16, wherein the first haptic intensity is associated with a first proximity of the target and the second haptic intensity is associated with a second proximity of the target.

18. The method of claim 16, wherein:
the first haptic intensity is associated with movement of a user character toward the target; and
the second haptic intensity is associated with movement of the user character away from the target.

19. The method of claim 16, wherein:
the first haptic intensity is associated with movement of a game reticle towards the target; and
the second haptic intensity is associated with movement of the game reticle away from the target.

20. The method of claim 16, wherein:
the game is hosted by an information handling system coupled to a network; and
intercepting one or more of video information and audio information from the information handling system hosting the game comprises intercepting one or more of video information and audio information received by a network interface.

* * * * *